United States Patent [19]

Alexander

[11] Patent Number: 4,778,439
[45] Date of Patent: Oct. 18, 1988

[54] APPARATUS AND METHOD FOR FORMING A CLAMSHELL ASSEMBLY

[75] Inventor: Garold W. Alexander, Noblesville, Ind.

[73] Assignee: Peerless Machine & Tool Corporation, Marion, Ind.

[21] Appl. No.: 63,412

[22] Filed: Jun. 18, 1987

[51] Int. Cl.$^4$ ............... B31B 3/44; B31B 3/52; B31B 3/02; B29C 51/00

[52] U.S. Cl. ............... 493/169; 493/59; 493/180; 493/902; 264/322; 264/324; 264/546; 264/550; 425/351; 425/398; 425/400; 425/412

[58] Field of Search ............... 493/52, 59, 61, 143, 493/167, 169, 180, 902; 264/319, 322, 324, 522, 544, 546, 550, 554; 425/398, 399, 400, 346, 351, 412

[56] References Cited

U.S. PATENT DOCUMENTS

| | | | |
|---|---|---|---|
| 1,920,809 | 8/1933 | Schmiedel | 93/36 |
| 3,149,545 | 9/1964 | Ehe | 93/60 |
| 3,640,668 | 2/1972 | Brown, Jr. et al. | 425/346 |
| 4,149,841 | 4/1979 | Patterson | 425/398 |
| 4,246,223 | 1/1981 | Patterson | 264/292 |
| 4,299,590 | 11/1981 | Sasaki | 493/164 |
| 4,381,278 | 4/1983 | Ingraffea | 264/512 |
| 4,427,476 | 1/1984 | Beck et al. | 156/199 |
| 4,514,353 | 4/1985 | Alexander et al. | 264/294 |
| 4,526,025 | 3/1985 | Goda et al. | 493/160 |
| 4,549,876 | 10/1985 | Baker et al. | 493/169 |
| 4,637,811 | 1/1987 | Fortney | 493/167 |

Primary Examiner—Frederick R. Schmidt
Assistant Examiner—William E. Terrell
Attorney, Agent, or Firm—Barnes & Thornburg

[57] ABSTRACT

An apparatus and method is provided for progressively converting each blank of sheet material in a stream of moving blanks into a clamshell assembly having interconnected lid and bottom portions. The apparatus includes a female die assembly having first and second mold cavities, an upstream control system for aligning one portion of each blank at a lid-pressing station defined by the first mold cavity, and a downstream control system for aligning a remaining portion of each blank at a bottom-pressing station defined by the second mold cavity. A male die assembly is provided for simultaneously forming a lid portion in one blank of sheet material and a bottom portion in an adjacent blank of sheet material. In particular, during each pressing cycle, the male die assembly simultaneously presses an initial blank at the bottom-pressing station and a succeeding blank at the lid-pressing station to produce the equivalent of a whole clamshell assembly on a single stroke of the male die assembly. This pressing cycle is repeated upon shifting the pressed blanks to a next downstream position to accomplish progressive conversion of each blank into a clamshell assembly.

30 Claims, 3 Drawing Sheets

APPARATUS AND METHOD FOR FORMING A CLAMSHELL ASSEMBLY

BACKGROUND AND SUMMARY OF THE INVENTION

The present invention relates to a press die system for forming clamshell container assemblies from a sheet of material by simultaneously forming the top portion in one blank of sheet material and the bottom portion in an adjacent blank of sheet material. More particularly, the present invention relates to an apparatus and method for progressively forming clamshell assemblies having two interconnected container portions such that the equivalent of the whole assembly is produced for each single stroke of a male die means.

Clamshell containers for temporarily storing food items, such as various types of sandwiches, are well known. The clamshell container assembly generally has a top portion or lid and a bottom portion that are interconnected by a connecting portion or hinge. By packaging an individual sandwich in this type of clamshell assembly, the sandwich is insulated somewhat to maintain a serving temperature, and is further protected from any contamination or damage from external sources. In addition, the clamshell container may serve as a convenient serving item for the sandwich, and may display graphics identifying the specific food item.

It has been common practice in the food industry to utilize clamshell container assemblies formed from synthetic materials such as expanded polystyrene. However, demand for expanded polystyrene clamshell container assemblies is falling because of environmental concerns related to the use of expanded polystyrene, and particularly to the well-known disposability problems affecting containers formed from expanded polystyrene.

Paperboard is an alternative material that provides a suitable replacement for expanded polystyrene in the manufacture of clamshell container assemblies. Significantly fewer environmental problems are associated with its manufacture and disposal. Additional advantages of paperboard clamshell assemblies in comparison to assemblies made of synthetic materials include improved printability and wider consumer acceptance. However, the inability to form easily and quickly a clamshell container assembly from paper stock has been a barrier to the development and use of paperboard in the clamshell container-forming industry.

One problem with conventional machines for forming paperboard clamshell containers is that it has been necessary to form each container portion of a clamshell assembly separately because of known problems related to drawing and forming the paperboard during the forming process. A description of some of these problems is included in U.S. Pat. No. 4,637,811 to Fortney.

A two-step process of converting a single blank of sheet material to form two interconnected clamshell assembly portions was generally required to address the above-noted problems. By requiring two sequential and separate forming strokes of the press machine, the time, and consequently the cost, of producing paperboard clamshell assemblies has retarded the acceptance of such paperboard clamshell assemblies in the industry.

Another problem with machines for forming paperboard clamshell assemblies is that such machines have been unable to form a skirt on one of the clamshell container portions. A skirt is desirable becuse it forms an overlapping closure when the two container portions are mated to form the assembled clamshell.

One object of the present invention is to provide a press die machine that is able to convert paperboard or other sheet material into clamshell container assemblies or the like quickly in an improved manner to avoid tearing the common hinge region interconnecting the container portions. In particular, a press die machine capable of producing the equivalent of a completed paperboard clamshell assembly for each individual stroke of the machine is desired to speed up container manufacturing rates.

Another object of the present invention is to provide a press die machine that is capable of forming a container closure skirt around one of the clamshell container portions.

According to the present invention, a die machine is provided for progressively forming a clamshell container assembly from a paperboard blank having leading and trailing portions. The die machine includes female die means, male die means, and press means for providing relative movement between the male and female die means. The female die means is formed to include first and second mold cavities. The male die means includes a first die for engaging the first mold cavity to establish a first pressing station and a second die for engaging the second mold cavity to establish a second pressing station.

First stop means is included for selectively blocking moement of a blank relative to the female die means to position a leading portion of the blank at the first pressing station so that one container portion of the clamshell assembly is formable in the first mold cavity upon mating engagement of the female and male die means during a first pressing operation. Shift means is provided for selectively moving the leading portion of the blank relative to the female die means to simultaneously conduct the leading portion of the blank past the second pressing station and the trailing portion of the blank past the first pressing station. Second stop means is provided for engaging the partially formed blank following operation of the shift means to position the trailing portion of the partially formed blank at the second pressing station so that the remaining container portion of the clamshell assembly is formable in the second mold cavity upon mating engagement with the male and female die means during a subsequent pressing operation.

In use, the first stop means positions the first blank in a proper position relative to the first mold cavity and the first male die such that one of the container portions of the clamshell assembly is formed from the leading portion of the blank when the first male die is moved into engagement with the first mold cavity during a first pressing operation. Following the first pressing operation, the shift means is activated and acts to move the completed first container portion out of the first mold cavity and to position the blank, and specifically the trailing portion of the blank, over the second mold cavity. The second stop means acts to position the trailing portion of the blank over the second mold cavity properly to permit the second mold cavity and second male die to form a second container portion upon engagement of the second male die with the second mold cavity during a second pressing operation.

As the trailing portion of the above-described first blank is being formed into the second container portion, a leading portion of a subsequent, second blank is simultaneously introduced into the machine and positioned in the first pressing station to permit formation of a first container portion of that second blank. Thus, during one downstroke of the male die means in the die machine, the equivalent of one clamshell assembly is completed by this simultaneous forming of the second container portion of the first blank and the first container portion of the spaced-apart, adjacent second blank.

One advantage of the foregoing structure is that the die machine of the present invention is capable of forming paperboard clamshell assemblies such that the equivalent of one completed assembly is produced for each stroke of the machine. In addition, during a single stroke of the press machine, only one container portion in each of a first and second blanks is being formed. One advantage of this feature is that, although the press machine is capable of producing the equivalent of a completed clamshell assembly for each stroke of the machine, the machine is nevertheless capable of producing interconnected container portions without the above-described paperboard drawing and forming problems that would normally be associated with simultaneously forming both container portions of the same blank.

In preferred embodiments of the present invention, the female die means is inclined with respect to a horizontal plane to cause a series of separate blanks to move by gravity through the die machine. In addition, the shift means includes ejector means for simultaneously ejecting blanks from the first and second mold cavities so that a blank ejected from the first mold cavity moves by gravity toward the second mold cavity.

One feature of the foregoing structure is that, because of the inclined orientation of the female die means, gravity is utilized to move the blanks over the first and second mold cavities and between the first and second pressing stations. One advantage of this feature is that no additional structure is necessary to move the blanks between the first and second pressing stations, which reduces the complexity of the machine, and increases its efficiency.

Thus, the press machine of the present invention is capable of producing the equivalent of a completed clamshell assembly with each stroke of the press machine dies. However, because of the progressive forming steps of the machine, problems normally associated with forming adjoining container portions from paperboard with one stroke of a press machine are eliminated.

Additional objects, features, and advantages of the present invention will become apparent to those skilled in the art upon consideration of the following detailed description of a preferred embodiment exemplifying the best mode of carrying out the invention as presently perceived.

BRIEF DESCRIPTION OF THE DRAWINGS

The detailed description particularly refers to the accompanying figures in which.

DETAILED DESCRIPTION OF THE DRAWINGS

Figures 1, 2, 3:
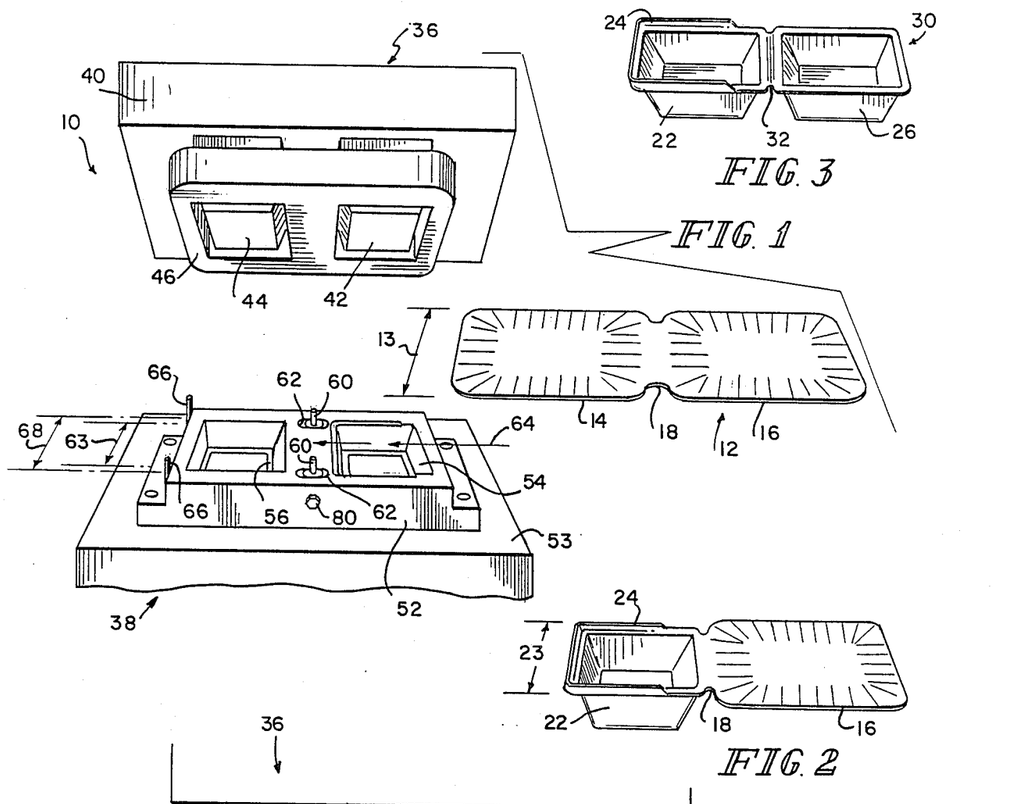
FIG. 1 is an exploded perspective view showing the cooperating die elements of the present invention and an unformed blank prior to positioning within the die elements.
FIG. 2 is a perspective view of a partially formed clamshell assembly.
FIG. 3 is a perspective view of a completed clamshell assembly.

Referring now to the drawings, FIG. 1 shows a press die apparatus 10 according to the present invention. FIG. 1 also shows an unformed scored blank 12 that is formed by the press die apparatus 10 into a completed clamshell assembly. It will be understood that the blank 12 has been precut to a predetermined dimension, and has additionally been formed to include scores which assist in permitting the blank 12 to be formed without stretching or other undesired deformation. Reference is hereby made to U.S. Pat. No. 4,149,841 to Patterson for a more complete discussion of various features and advantages of utilizing a scored blank of the type suitable for use in the press die apparatus 10.

The unformed blank 12 has an unformed width illustrated by the dimension 13. The unformed blank 12 is divided into a leading portion 14 and a trailing portion 16. A connecting portion 18 interconnects the leading portion 14 and the trailing portion 16.

The press die apparatus 10 is first utilized to form the leading portion 14 into a first container or dish portion 22 as illustrated in FIG. 2. The first container portion 22 has a formed width illustrated by the dimension 23. In addition, the first container portion 22 is formed to include an upstanding skirt 24, the use of which will be discussed later. Following the formation of the first container portion 22, the press die apparatus 10 forms the trailing portion 16 of the blank 12 into a second container or dish portion 26 as illustrated in FIG. 3.

By progressively forming the first container portion 22 and the second container portion 26, a completed clamshell assembly 30 is formed that includes an integral connector 32. The completed clamshell assembly 30 is shown in an open arrangement ready for use in FIG. 3. The second container portion 26 is configured to be used as the portion receiving the food item or sandwich. The first container portion 22 is configured to be utilized as a lid which is pivotally mateable with the second container portion 26 to provide a closed clamshell assembly (not shown).

Referring again to FIG. 1, the press die apparatus 10 includes a top die assembly 36 and an opposing bottom die assembly 38. The top die assembly 36 is connected to drive means (not shown) which provides reciprocating movement of the top die assembly 36 toward and away from the bottom die assembly 38. A punch holder 40 is attached to the top die assembly 36. A first male punch 42 is mounted in the punch holder 40. A second male punch 44 is also mounted in the punch holder 40 and is spaced apart from the first male punch 42 in a downstream direction. A draw ring 46 is disposed around both the first male punch 42 and the second male punch 44. Reference is again made to U.S. Pat. No. 4,149,841 to Patterson for a description of a suitable system for driving the male punches and the draw ring.

The bottom die assembly 38 includes a female cavity plate 52 that is firmly attached to a base member 53. A first female die cavity or mold cavity 54 is formed in the female cavity plate 52, with the first female die cavity 54 positioned directly below the first male punch 42. A second female die cavity or mold cavity 56 is formed in the female cavity plate 52 and is spaced apart from the first female die cavity 54 in the downstream direction. The second female die cavity 56 is positioned directly below the second male punch 44.

A pair of retractable blank stop pins 60 are adjustably mounted in the female cavity plate 52 between the first female die cavity 54 and the second female die cavity 56. The retractable blank stop pins 60 are movable from an extended position (shown in FIG. 1) to a retracted position where the pins 60 are flush with the upper surface of the female cavity plate 52. The mechanism for extending and retracting the pins 60 will be described below in the discussion related to FIG. 4. The retractable pins 60 are mounted in elongated slots 62 for adjustable movement in the upstream and downstream directions. The adjustment of the retractable pins 60 in the slots 62 will also be described below in the discussion related to FIG. 4.

As shown in FIG. 1, retractable pins 60 are spaced apart from each other a distance equal to the dimension 63. The dimension 63 or distance between the retractable pins 60 is smaller than the dimension 13 or width of the unformed blank 12. Thus, as the unformed blank 12 enters the press die apparatus 10 in the direction indicated by arrow 64, the retractable pins 60 will engage the leading edge of the blank 12, as illustrated in FIG. 4, to align the leading portion 14 of the blank 12 between the first female die cavity 54 and the first male punch 42.

In addition to the retractable stop pins 60, two stationary blank stop posts 66 are also attached to the female cavity plate 52. The stationary stop posts 66 are attached in spaced apart relation near the downstream end of the second female die cavity 56. The stationary stop posts 66 are spaced apart a distance illustrated by the dimension 68 (FIG. 1). The dimension 68 is sized to be smaller than the dimension 13, but somewhat larger than the dimension 23. This relationship between the dimensions 68, 13, and 23 will be discussed below.

Figure 4:
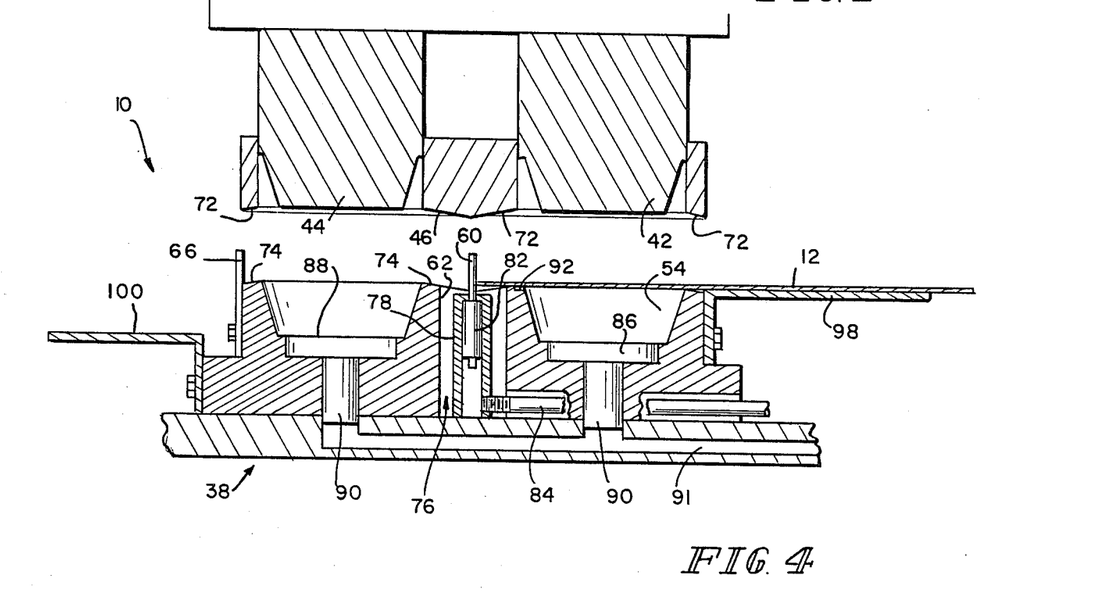
FIG. 4 is a cross sectional view taken through the die assembly with a portion of the unformed blank positioned in the first pressing station.

Details of the top die assembly 36 and the bottom die assembly 38 in press die apparatus 10 are illustrated in FIG. 4 with the blank 12 shown abutting the extended retractable pins 60. The draw ring 46 of the top die assembly 36 includes drawing faces 72 that are angled somewhat with respect to the plane of the blank 12. The periphery of the first and second female die cavities 54, 56 is formed to include angled drawing faces 74, with the angles corresponding to the angles of the drawing faces 72. Reference is again made to U.S. Pat. No. 4,637,811 to Fortney for a discussion of the cooperation of drawing faces during a forming operation of paperboard containers.

Each retractable stop pin 60 is part of a blank stop assembly 76 (only one of which is shown in FIG. 4). The blank stop assembly 76 includes an adjustable support member 78 that is movably mounted within the slot 62 so that the press die apparatus 10 is calibratable for varying sizes of blanks. The support member 78 is illustratively locked against movement within the slot 62 by an adjusting screw 80 (shown only in FIG. 1).

The stop pins 60 are adjusted within the slots 62 to align the leading portion 14 of the blank 12 properly in the first pressing station defined between the first female die cavity 54 and the first male punch 42. Specifically, the lateral positioning of the stop pins 60 dictates the amount of material of the leading portion 14 of the blank 12 available to form the skirt 24. It will be understood that the stop pins 60 are normally adjusted only at the beginning of a run of blanks 12, and once set, does not normally need to be adjusted again unless the size of the blanks 12 is changed.

Each stop pin 60 is raised and lowered by a piston means 82 that is adapted for movement within the support 78. A supply tube 84 is coupled to the interior of the adjustable support 78 and acts to drive the piston means 82 upwardly and downwardly to either extend or retract the stop pin 60. It will be understood that the supply tube B4 is coupled to a fluid supply (not shown) that may be either air or some other piston-activating fluid. In the preferred embodiment, high pressure air is utilized selectively to raise and lower the piston 82.

Figure 6:
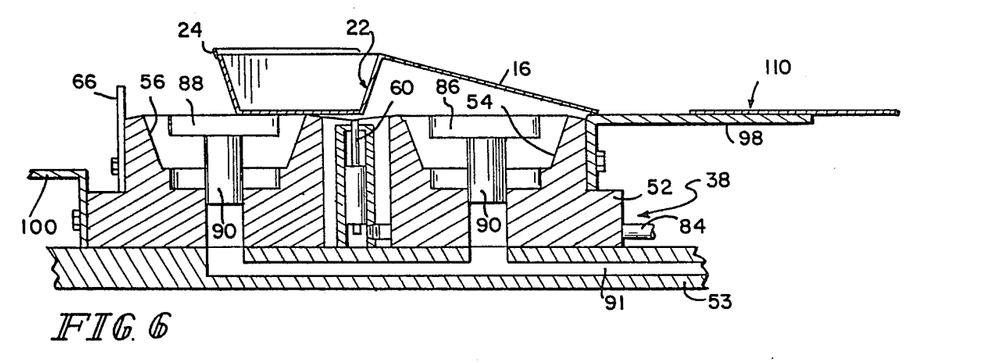
FIG. 6 is a view similar to FIG. 5, but with the upper male die removed and the formed first container portion ejected from the first mold cavity and the trailing portion of the blank in transit toward the second pressing station.

A first ejector pad 86 is disposed within the bottom of the first female die cavity 54 and is adapted for movement within the first female die cavity 54 from a retracted position (shown in FIG. 4) to an extended position (shown in FIG. 6). An identical second ejector 88 is disposed within the second female die cavity 56 and, like the first ejector 86, is configured to move from a retracted position (FIG. 4) to an extended position (FIG. 6). The first ejector 86 and second ejector 88 are driven by pistons 90 that are jointly in fluid communication with a supply conduit 91. The supply conduit 91 is coupled to a fluid supply (not shown) that provides the necessary fluid to drive the cylinders 90. It will be understood that the fluid supply (not shown) could be any of a number of suitable hydraulic, pneumatic, or other drive means. In a preferred embodiment, the fluid supply (not shown) is high pressure air to drive the pistons 90.

A skirt-forming section 92 is formed around a portion of the periphery of the first female die cavity 54 to provide an indention in which skirt 24 is formed. The skirt-forming section 92 cooperates with the first male die 42 to press-form the skirt 24 (FIGS. 2 and 3) as the first container portion 22 is being formed during mating of the male and female die means.

A first support shelf 98 is provided upstream of the first female die cavity 54. The first support shelf 98 acts to support the trailing portion 16 of the blank 12 while the leading portion 14 is positioned in the first pressing station as illustrated in FIG. 4. In addition, a second support shelf 100 is provided downstream of the second female die cavity 56. The use of the second support shelf 100 will be described below in the discussion related to FIGS. 7 and 8.

Figure 9:
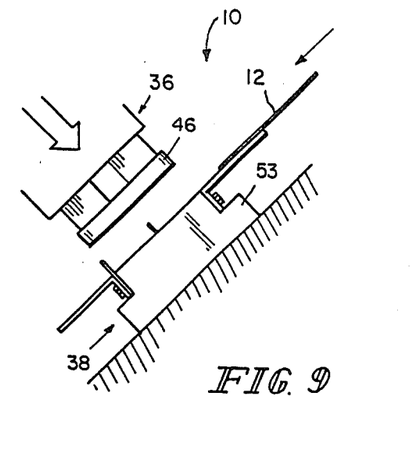
FIG. 9 is a view of the embodiment in FIG. 1 showing the cooperating die elements in an inclined orientation to accept a gravity-fed blank.

In operation, the blank 12 is moved into the press die apparatus 10 until it abuts the extended stop pins 60. This orientation is illustrated in FIG. 4. Movement of the blank 12, and of succeeding blanks, may be accomplished by using a variety of known means (not shown). In the preferred embodiment, a gravity-feed system as shown in FIG. 9 is utilized for moving the blanks 12 through the press die apparatus 10. As shown in FIG. 9, the top die assembly 36 and bottom die assembly 38 are oriented at an angle to a horizontal plane to permit the blanks 12 to fall by gravity through these assemblies.

Because the spacing 63 between the retractable stop pins 60 is smaller than the width 13 of the leading portion 14 of the blank 12, as the blank 12 moves into the press die apparatus 10, the leading edge of the leading portion 14 will contact the extended stop pins 60 to align the leading portion 14 accurately over the first female die cavity 54. The trailing portion 16 of the blank 12 will be supported on the first support shelf 98. In this position, as illustrated in FIG. 4, the blank 12 is positioned properly prior to forming the first container portion 22.

Figure 5:
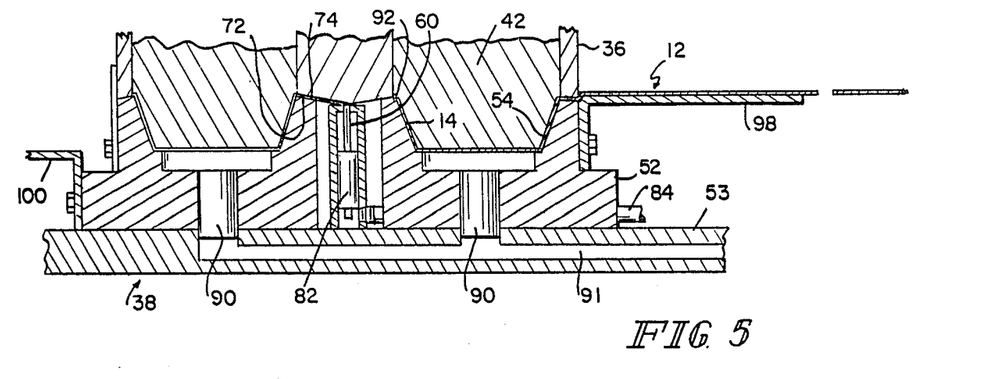
FIG. 5 is a view similar to FIG. 4, but with the first male die and first mold cavity in mating relation to form a first container portion in the leading portion of the blank.

The forming operation of the first container portion 22 is illustrated in FIG. 5. Specifically, the top die assembly 36 has been lowered by the drive means (not shown) so that the first male punch 42 has mated with the first female die cavity 54 to form the leading portion 14 of the blank 12 into the first container portion 22. During this forming operation, the drawing faces 72, 74 cooperate in a known manner to form the first container portion 22. In addition, the skirt-forming section 92 cooperates with the first male punch 42 to form the upstanding skirt 24 (FIGS. 2 and 3) in the peripherally extending indention.

Referring now to FIG. 6, after the first container portion 22 is formed in the first pressing station, the top die assembly 36 (not shown in FIG. 6) is raised to move the first and second male punches 42, 44 (not shown in FIG. 6) out of mating engagement with the first and second female die cavities 54, 56. At the same time, the first ejector 86 moves to the extended position to eject the formed first container portion 22 from the first female die cavity 54. Because the retractable stop pins 60 have been retracted prior to engagement of the top die assembly 36 with the bottom die assembly 38 (illustrated in FIG. 5), the formed first container portion 22, after being ejected from the first female die cavity 54, moves by gravity toward the second female die cavity 56. Because the second ejector 88 moves in unison with the first ejector 86, the second ejector 88 is also in the extended position and acts to block entry of the first container portion 22 into the second female die cavity 56.

Figure 7:
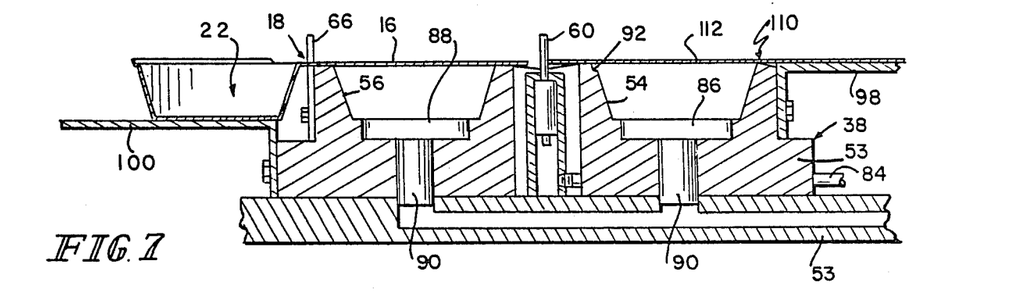
FIG. 7 is a view similar to FIG. 6, but with the trailing portion of the first blank positioned in the second pressing station and a leading portion of a subsequent unformed blank positioned in the first pressing station.

Thus, the first container portion 22 slides over the second female cavity 56, with the movement of the first container portion 22 and connected unformed trailing portion 16 being stopped when the leading edge of a trailing portion 16 contacts the stationary stop posts 66. Because the finished width 23 (FIG. 2) of the first container portion 22 is smaller than the dimension 68 (FIG. 1), the first container portion 22 freely moves between the stationary posts 66 and rests on the second support shelf 100 as illustrated in FIG. 7.

Engagement of the leading edge of trailing portion 16 against stationary stop posts 66 causes the trailing portion 16 of the first blank 12 to be positioned above the second female die cavity 56 in proper alignment for forming the second container portion 26 in blank 12. This orientation of the first blank 12, and specifically of the trailing portion 16 in the second pressing station defined by the second female die cavity 56 and the second male punch 44, is illustrated in FIG. 7. In addition, FIG. 7 illustrates a subsequent, second blank 110 that has been positioned in the first pressing station. After the first container portion 22 has passed the retractable stop pins 60, the retractable stop pins 60 are moved to the extended position as illustrated in FIG. 7 to engage the leading edge of the second blank 110 to properly align the second blank 110 in the first pressing station.

Figure 8:
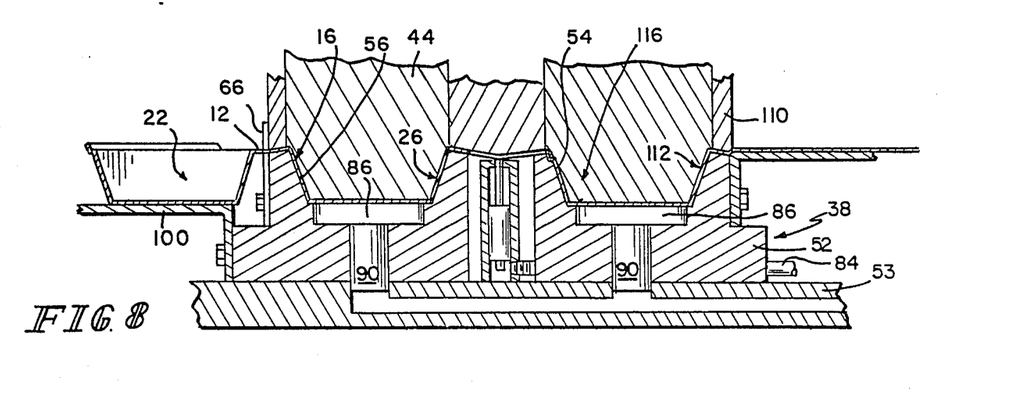
FIG. 8 is a view similar to FIG. 5, with the first and second male dies mated with the first and second mold cavities to form a second container portion in the first blank and a first container portion in the subsequent blank.

Press-forming of the trailing portion 16 of the first blank 12 into the second container portion 26 is illustrated in FIG. 8. Simultaneously with such formation, a leading portion 112 of the second blank 110 is formed in the first pressing station to provide a first container portion 116. The forming of the first container portion 116 of the second blank 110 is identical to the forming of the first container portion 22 of the first blank 12 described previously.

Thus, as the blanks move through the press die apparatus 10, a second container portion of a preceding blank is formed simultaneously with a first container portion of a second blank. In this manner, two container portions are formed, however the container portions are parts of separate clamshell assemblies. Such progressive formation overcomes the problems normally associated with simultaneously forming two containers in a single blank to provide one clamshell assembly. Additionally, by forming two container portions of two separate clamshell assemblies, the equivalent of a whole clamshell assembly is produced with each downward material-engaging stroke of the top die assembly 36. By permitting the first container portion 22 of the first blank 12 to be conducted over the second press station, and by permitting a succeeding blank 110 to enter the first pressing station, progressive forming of container portions is accomplished.

A diagrammatic illustration of the press die apparatus 10 in its preferred inclined orientation is shown in FIG. 9. This arrangement advantageously allows movement of blanks 12 between top die assembly 36 and bottom die assembly 38 under gravity.

Although the invention has been described in detail with reference to certain preferred embodiments, variations and modifications exist within the scope and spirit of the invention as described and defined in the following claims.

What is claimed is:

1. A die set for progressively converting each blank in a series of blanks moving in a downstream direction through the die system into a clamshell assembly having interconnected lid and bottom portions, the die set comprising a pair of adjcaent die means including upstream die means having a first female die and a first male die for forming the lid portion of each clamshell assembly and downstream die means having a second female die and a second male die for forming the bottom portion of each clamshell assembly, and control means for controlling the movement of the blanks relative to the pair of adjacent die means such that a bottom portion is being formed in a leading blank by the downstream die means while a lid portion is being formed in an adjacent trailing blank by the upstream die means.

2. The die set of claim 1, wherein the upstream die means includes means for forming an upstanding skirt in each blank along a peripheral edge of each lid portion, the skirt being configured to surround a companion bottom portion upon folding the lid portion about an axis to mate with the bottom portion, thereby providing a peripherally extending closure.

3. The die set of claim 1, wherein the upstream and downstream die means each include a female mold cavity and the control means includes a first ejector in the mold cavity of the downstream die means, a second ejector in the mold cavity of the upstream die means, and actuation means for moving the first and second ejectors in unison from retracted positions to blank-ejecting positions so that each lid portion ejected from the upstream die means by the second ejector is blocked from entering the mold cavity of the die means by the first ejector in its blank-ejecting position.

4. The die set of claim 1, wherein the upstream and downstream die means each include a female mold cavity, the die means is inclined to cause blanks to move under gravity over the female mold cavities, and the control means further including ejector means for simultaneously ejecting blanks from the first and second mold cavities so that a blank ejected from the mold cavity of the upstream die means moves toward the downstream die means.

5. The die means of claim 4, wherein the control means further includes upstream stop means engaging each gravity-fed blank introduced into the die set for aligning a portion of said each introduced blank at a lid-pressing station provided by the upstream die means and downstream stop means enaging each gravity-fed blank ejected from the female mold cavity of the upstream die means for aligning a remaining unpressed portion of said each ejected blank at a bottom-pressing station provided by the downstream die means.

6. The die set of claim 5, wherein the ejector means includes a first ejector in the mold cavity of the downstream die means, a second ejector in the mold cavity of the upstream die means, and actuation means for moving the first and second ejectors in unison from retracted positions to blank-ejecting positions so that each lid portion ejected from the upstream die means by the second ejetor is blocked from entering the mold cavity of the downstream die means by the first ejector in its blank-ejecting position.

7. A die set for progressively forming a clamshell container assembly from a blank having leading and trailing portions, the die set comprising female die means formed to include first and second mold cavities, male die means including a first die for engaging the first mold cavity to establish a first pressing station and a second die for engaging the second mold cavity to establish a second pressing station, press means for providing relative movement between the male and female die means, first stop means for selectively blocking movement of a blank relative to the female die means to position a leading portion of a blank at the first pressing station so that one container portion of a clamshell container assembly is formed in the first mold cavity upon mating engagement of the female and male die means during a first pressing operation, shift means for selectively moving the leading portion of said blank relative to the female die means to conduct the leading portion of said blank past the second pressing station and the trailing portion of said blank past the first pressing station, and second stop means for engaging the partially formed blank following operation of the shift means to position the trailing portion of said partially formed blank at the second pressing station so that the remaining container portion of the clamshell container assembly is formed in the second mold cavity upon mating engagement with the male and female die means during a subsequent pressing operation.

8. The die set of claim 7, wherein the female die means is formed to include a passageway having an opening confronting the male die means in a location intermediate the first and second mold cavities, and the first stop means includes a stop member movably mounted in the passageway and means for moving the stop member relative to the female die assembly between a projected position blocking movement of the blank toward the second mold cavity and a retracted position.

9. The die set of claim 7, wherein the second stop means includes a pair of stop pins fixed to the female die means in a location adjacent to the second mold cavity, the stop pins are positioned in spaced-apart relation to define a predetermined dimension therebetween that is greater than the maximum width of the container portion formed at the first pressing station and lesser than the minimum width of the trailing portion of the partially formed blank conducted toward the second mold cavity by the shift means so that said trailing portion engages the stop means during movement relative to the female die means to limit further movement of said partially formed blank and position its trailing portion at the second pressing station.

10. The die set of claim 7, wherein the female die means is inclined to cause blanks to move under gravity over the first and second mold cavities and the shift means includes ejector means for simultaneously ejecting blanks from the first and second mold cavities so that a blank ejected from the first mold cavity moves under gravity towards the second mold cavity.

11. The die set of claim 7, wherein the ejector means includes a first ejector extending into the first mold cavity and a second ejector extending into the second mold cavity, and actuation means for moving the first and second ejectors in unison from retracted positions to article-ejecting positions so that the article ejected from the first mold cavity is blocked from entering the second mold cavity by the first ejector in its article-ejecting position.

12. A press die system for progressively converting each blank in a series of blanks moving in a downstream direction through the press die system into a clamshell assembly having interconnected first and second containers, each blank including interconnected leading and trailing portions, the press die system comprising a female die assembly formed to include upstream and downstream mold cavities, downstream control means coupled to the female die assembly for aligning a trailing portion of a selected blank moving over the female die assembly in a predetermined downstream position overlying the downstream mold cavity, upstream control means coupled to the female die assembly for aligning a leading portion of a succeeding blank following behind said selected blank and moving over the female die assembly in a predetermined upstream position overlying the upstream mold cavity, and male die means for substantially simultaneously pressing the trailing portion of the selected blank into the downstream mold cavity and the leading portion of the succeeding blank into the upstream mold cavity so that one of the first and second containers is formed in each of said selected and succeeding blanks during one pressing cycle of operation of the male die means.

13. The press die system of claim 12, wherein the downstream control means includes stop means for engaging selected portions of each blank moving past the downstream mold cavity to control alignment of said blanks relative to the downstream mold cavity.

14. The press die system of claim 13, wherein the stop means includes a pair of stop members situated in downstream relation to the downstream mold cavity of the female die assembly and positioned in spaced-apart relation to define a predetermined dimension therebetween selected to permit movement of the container formed in the leading portion of each said succeeding blank between the pair of stop members without permitting movement of the interconnected trailing portion between the pair of stop members so that a portion of said succeeding blank intermediate its leading and trailing portions is engaged by the stop members to block further movement of said succeeding blank relative to the female die assembly.

15. The press die system of claim 12, wherein the upstream control means includes stop means for selectively engaging blanks moving past the upstream mold cavity to control alignment of said blanks relative to the upstream mold cavity.

16. The press die system of claim 15, wherein the upstream and downstream mold cavities are situated in spaced-apart relation to provide a region of the female die assembly therebetween, and the stop means includes at least one stop member movably mounted to the region and means for moving the at least one stop member relative to the female die assembly between a projected position blocking further movement of blanks toward the downstream mold cavity and a retracted non-blocking position.

17. The press die system of claim 15, further comprising means for selectively moving the stop means along a path extending between the upstream and downstream mold cavities to control the position of the leading portion of each unconverted blank relative to the underlying upstream mold cavity so that the press die system is calibratable for varying sizes of blanks.

18. The press die system of claim 12, further comprising ejector means for simultaneously ejecting blanks from the upstream and downstream mold cavities.

19. The press die system of claim 18, further comprising shelf means for supporting the container formed in the leading portion of the selected blank while the trailing portion of the selected blank is in its predetermined downstream position, the shelf means being coupled to a downstream portion of the female die assembly to receive said container following ejection of the selected blank from the downstream mold cavity, thereby aiding in maintaining said trailing portion in a predetermined plane during operation of the male die means.

20. The press die system of claim 18, wherein the ejector means includes a first ejector extending into the downstream mold cavity and a second ejector extending into the upstream mold cavity, and actuation means for moving the first and second ejectors in unison from retracted positions to container-ejecting positions so that the container ejected from the upstream mold cavity is blocked from entering the downstream mold cavity by the first ejector in its container-ejecting position.

21. The press die system of claim 12, further comprising shelf means for supporting the unconverted trailing portion of the succeeding blank while the leading portion of the succeeding blank is in its predetermined upstream position, the shelf means being coupled to an upstream portion of the female die assembly to receive the converted leading portion of each blank moved into alignment with the upstream mold cavity.

22. A method of progressively converting each blank in a stream of moving blanks into a clamshell assembly having interconnected first and second containers, each blank including interconnected leading and trailing portions, the method comprising the steps of providing a die set having female die means formed to include first and second mold cavities, male die means for mateably engaging the first and second mold cavities, and press means for providing relative movement between the male and female die means, introducing a first blank provided in the stream of moving blnaks into the die set through a space intermediate the male and female die means, first aligning a leading portion of the first balnk in a predetermined ustream position intermediate the first mold cavity and the male die means to establish a first presssing station.

first moving the male die means into mating engagement with the first mold cavity to form a first container in the leading portion of the first blank in its predetermined upstream position, thereby providing a partially formed first blank, conducting the partially formed first blank in a downsteam direction toward the second mold cavity, second aligning a trailing portion of the partially formed first blank in a predetermined downstream position intermediate the second mold cavity and the male die means to eastablish a second pressing station, and second moving the male die means into mating engagement with the second mold cavity to form a second container in the trailing portion of the initial blank in spaced relation to the previously formed first container so that a clamshell assembly having interconnected first and second containers is produced.

23. The method of claim 22, further comprising the steps of introducing a succeeding blank into the die set through the space intermediate the male and female die means during the conducting step, and subsequently aligning a leading portion of the succeeding blank in the predetermined upstream position at the first pressing station.

24. The method of claim 23, wherein the second moving step further includes the step of moving the male die means into mating engagement with the first mold cavity to form a first container in the leading portion of the succeeding blank simultaneously with the formation of the second container in the trailing portion of the first blank, thereby providing a partially formed succeeding blank.

25. The method of claim 24, further comprising the steps of removing the first blank from the die set, conducting the partially formed succeeding blank in a downstream direction toward the second mold cavity, and aligning the trailing portion of the partially formed succeeding blank in the predetermined downstream position at the second pressing station.

26. The method of claim 22, wherein the first aligning step includes the steps of providing at least one stop member movably mounted to the female die means in a region intermediate the first and second mold cavities, and moving the at least one stop member relative to the female die assembly from a retracted non-blocking position within the female die assembly to a projected position blocking further movement of the first blank in a downstream direction toward the second mold cavity to control alignment of said first blank relative to the first mold cavity.

27. The method of claim 26, wherein the conducting step further includes the step of moving the at least one stop member to its retracted non-blocking position to permit further movement of the first blank toward its predetermined downstream position.

28. The method of claim 22, wherein the second aligning step includes the steps of providing a pair of stop members situated in downstream relation to the second mold cavity and positioned in spaced-apart relation to define a predetermined distance therebetween selected to permit movement of the container formed at the first pressing station between the pair of stop members, the trailing portion of each blank having a width dimension in excess of said predetermined distance, and permitting movement of each partially formed first blank relative to the female die means during the conducting step until an edge of the trailing portion engages the pair of stop members to block further movement of the first blank relative to the female die means, thereby controlling alignment of said first blank relative to the second mold cavity.

29. The method of claim 22, wherein the conducting means further includes the steps of ejecting the container press-formed in the leading portion of the first blank at the first pressing station, blocking the second mold cavity to prevent the leading portion of the first blank from entering the second mold cavity, and subsequently unblocking the second mold cavity to permit the male die means to press the trailing portion of the first blank into the second mold cavity to form the second container in the first blank.

30. The method of claim 29, further comprising the steps of providing ejector means extending into the second mold cavity for ejecting the container press-formed in the trailing portion of the first blank of the second pressing station, the ejector means being movable between retracted and container-ejecting positions, and moving the ejector means to its container-ejecting position to accomplish the blocking step.

* * * * *

UNITED STATES PATENT AND TRADEMARK OFFICE
CERTIFICATE OF CORRECTION

PATENT NO. : 4,778,439
DATED : October 18, 1988
INVENTOR(S) : Garold W. Alexander It is certified that error appears in the above-identified patent and that said Letters Patent is hereby corrected as shown below:

At column 6, line 28, please delete "B4" and insert therefor --84--;

At column 9, line 28, please delete "enaging" and insert therefor --engaging--;

At column 9, line 40, please delete "ejetor" and insert therefor --ejector--;

At column 12, line 21, please delete "blnaks" and insert therefor --blanks--;

At column 12, line 26, please delete "." (period) and insert therefor --,-- (comma); and At column 12, line 38, please delete "eastablish" and insert therefor --establish--.

Signed and Sealed this

Eleventh Day of April, 1989

Attest:

DONALD J. QUIGG

*Attesting Officer*

*Commissioner of Patents and Trademarks*